United States Patent [19]

Klein

[11] 3,725,587

[45] Apr. 3, 1973

[54] APPARATUS FOR A TELEPHONE EXCHANGE SYSTEM WITH CONFERENCE EQUIPMENT AND HAVING A VIDEO CAPABILITY

[75] Inventor: Peter Klein, Feldafing, Germany

[73] Assignee: Siemens Aktiengesellschaft, Berlin and Munich, Germany

[22] Filed: Jan. 27, 1972

[21] Appl. No.: 221,238

[30] Foreign Application Priority Data

Jan. 29, 1971 Germany....................P 21 04 338.9

[52] U.S. Cl. ..............................179/2 TV, 179/1 CN

[51] Int. Cl. .........................H04m 11/08, H04m 3/56

[58] Field of Search .......179/2 TV, 2 DP, 1 CN, 1 H; 178/DIG. 13, 6.8

[56] References Cited

UNITED STATES PATENTS 3,636,265 1/1972 Kikuchi et al......................179/2 TV 3,519,744 7/1970 Dorros..............................179/2 TV 3,601,530 8/1971 Edson et al........................179/2 TV

*Primary Examiner*—Kathleen H. Claffy

*Assistant Examiner*—Thomas D'Amico

*Attorney*—William E. Schuyler, Jr. et al.

[57] ABSTRACT

Apparatus is described for completing a conference connection in a telephone exchange system having a video capability. Each subscriber station has a video device constituted by a camera and a television receiver which may be connected to common video lines. Upon connection of a conference signal receiver and through a temporarily operated switch a new subscriber station's video device may be connected to the conference connection. This connection may be completed regardless of whether a conference connection already exists. Subsequently, switching means at each subscriber station, which connect the video devices therein to common video lines, are activated to switch the video devices in the subscriber stations, which were already in the conference connection, so that they can receive video signals from a subscriber station newly entering the conference connection.

4 Claims, 7 Drawing Figures

APPARATUS FOR A TELEPHONE EXCHANGE SYSTEM WITH CONFERENCE EQUIPMENT AND HAVING A VIDEO CAPABILITY

BACKGROUND OF THE INVENTION

The invention relates to a circuit arrangement for a telephone exchange system having conference signal receivers which can be engaged from the subscriber stations to form a conference connection, and having a voice conference transmission network, in which video devices consisting of a television camera and a television receiver are connected to the subscriber stations which are to take part in the conference connection. The video devices can be connected to common video lines.

In addition to the well known networks for audio telephone conference connections network configurations for conference connections between subscribers having video equipment, as well, have become known. In the latter case, the video devices consisting of a television camera and a television receiver, which are attached to the individual telephone, are connected with each other over common transmission lines. Of these transmission lines, for example, one can be engaged by the individual telephones, another by the individual television cameras and a third by the individual television receivers. The latter two video lines can be connected with each other over a video transmitter. Whereas the television receivers of all participant stations in the conference connection are connected with the first video line for the whole duration of the conference, at the start of the conference only the television camera of the subscriber station which convenes the conference is connected to the second video line, so that then only the picture of the one convening the conference appears on the television receivers of all participant stations. In the further course of the conference connection, every other subscriber station can then be connected with its television camera to the second video line, so that the one who is speaking becomes visible on the television receivers of all other conference participants.

In the German Patent No. 1,914,874, a video telephone — conference circuit is shown, which contains a series of subscriber apparatuses, which are built to send and receive audio-signals as well as video-signals, and with provisions by which the individual subscriber apparatuses are connected in audio and in video in the course of the conference, in a novel manner.

It is an object of the invention to provide means for enabling each subscriber at subscriber stations equipped with video devices to enter into a conference connection in picture and sound automatically, while maintaining the control measures necessary when entering such a conference connection.

SUMMARY OF THE INVENTION

The foregoing and other objects are achieved according to the invention by engaging a conference signal receiver independently of the momentary state of the conference connection, through a temporarily activatable switching means. This switching means initiates the audio and video connection of a new subscriber station into the conference connection. Subscriber-individual switching means which connect the video devices of the subscriber stations taking part in the conference connection with each other over a common picture lines on a voice-dependent basis can be controlled for the purpose of a change-over of the video devices which can be connected to the common video lines. This change-over serves to introduce the newly entering participant into the conference connection.

In accordance with another aspect of the invention, the aforementioned switching means is necessarily switched on for a short time by the switching means activated when the conference signal receiver is engaged, is permanently connected to the subscriber station which newly enters the conference connection, and can be controlled voice-dependently in the further course of the conference. Thus, with this switching means the video device of the subscriber station, which newly enters the conference connection, can be connected with its camera to the common single-picture line. In addition, thereby a subscriber-common switching means can be switched on, through which the video devices of subscriber stations already in conference can be connected at the receiver end to the common single-picture device, and the video device of the subscriber station, which newly enters the conference connection, can be connected at its receiver to a combined video line transmitting a collective picture composed of individual pictures of the various subscribers in the conference connection.

In a further aspect of the invention, the temporary activation of the switching means which introduces the audio and video connection of a new subscriber station to the conference connection proceeds through a signal emitted by an automatic subscriber station. The automatic station is dialed by all subscriber stations entering the conference connection by dialing a special code number, after identification of the subscriber station which is dialing.

Among the advantages achieved with the invention, each participant at the subscriber station equipped with a video device can enter a conference connection automatically by dialing an automatic subscriber station. Thus, for entrance into as well as for the initial construction of a conference connection, no operator or other intermediary is necessary. After the automatic subscriber station has given to the subscriber, who dialed it, an informative reference picture and this subscriber then indicates, by not hanging up his hand piece, the desire to enter a conference connection, which is already in progress, the automatic subscriber station initiates the audio and video connection of this new participant. The participants already in conference have the possibility of control over the newly entering participant inasmuch as he appears automatically on the screens of all participants already in conference upon entrance into the conference hook-up. The new participant, however, receives a collective picture of all participating subscribers.

BRIEF DESCRIPTION OF THE DRAWINGS

The principles of the invention, by which the foregoing objects and advantages are obtained, will be more readily understood by reference to a description, given below, of a preferred embodiment constructed according to the principles in conjunction with the drawings in which.

DETAILED DESCRIPTION OF THE DRAWINGS

Figure 1:
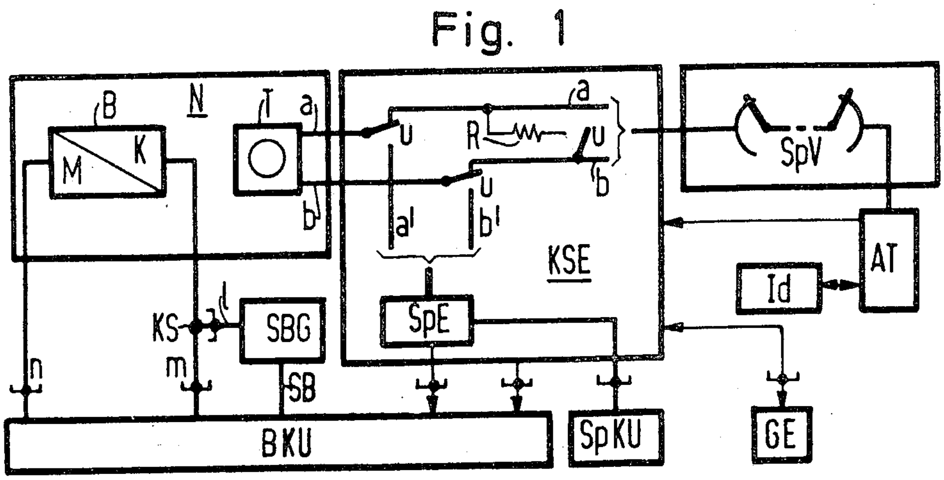
FIG. 1 is a schematic diagram of a telephone exchange system constructed to facilitate audio and video conference connections.

According to FIG. 1, each subscriber station N is equipped with the possibility of participation in a conference connection in voice and picture. Each has an audio telephone set T and a video device B consisting of a television camera K and a television receiver M. To every video-telephone subscriber station N with conference capability can be attached individually a conference signal receiver KSE. Upon entrance into a conference connection, KSE switches (using relays U1 – 3 in FIG. 4) the audio cables *a*, *b* of the subscriber station N, which normally lead into the telephone exchange device S*p*V, over to the voice conference transmission network *sp*KU over the audio cables *a'*, *b'*. This conference signal receiver serves, besides, to receive and evaluate the voice and circuit signals of the television conference subscriber station N. Upon entrance into the conference connection, the conference signal receiver KSE assumes further the excitation of subscriber station N and controls the connection of picture cables *m*, *n* of the television conference subscriber station N to the picture conference transmission network BKU, after the aforementioned switch-over of audio cables *a*, *b*.

The through-switching of picture cables *m*, *n* of the individual television conference subscriber stations participating in the conference connection proceeds in the video conference transmission network BKU. The signals for the through-switching are emitted by a voice receiver S*p*E placed in the conference signal receiver which is engaged by the respective television conference subscriber station. The entrance into the television conference connection proceeds for each subscriber station N over the telephone exchange device S*p*V by dialing an automatic subscriber station AT. The latter identifies the dialing subscriber station N over an identification device I*d* and, if there is a positive identification result (e.g., identification, authorization), emits a signal to the conference signal receiver KSE which is permanently connected to the calling subscriber station. On this basis, the control processes to switch-over the audio wires *a*, *b* to the voice conference transmission network S*p*KU and to connect the video cables *m*, *n* to the video conference transmission network BKU are initiated. One of the video cables; namely, the camera line *m*, can be coupled to a combined picture emitter SBG, described below, over the coupling point KS.

In a television conference connection, the video signals must also be directed to the individual subscriber stations, along with the voice signals. Normally, in this case, the picture of the conference participant who is speaking is transmitted to the television receiver of all subscriber stations participating in the conference connection. Moreover, it is desirable, however, especially with a larger number of conference participants, to give each participant the possibility of making himself a picture of the momentary composition of the conference participants. This is facilitated by the arrangement described herein through the presence of a combined picture line, on which, during the entire duration of the conference, a combined picture composed of the single-pictures of all conference participants is available for each conference participant.

Figure 2:
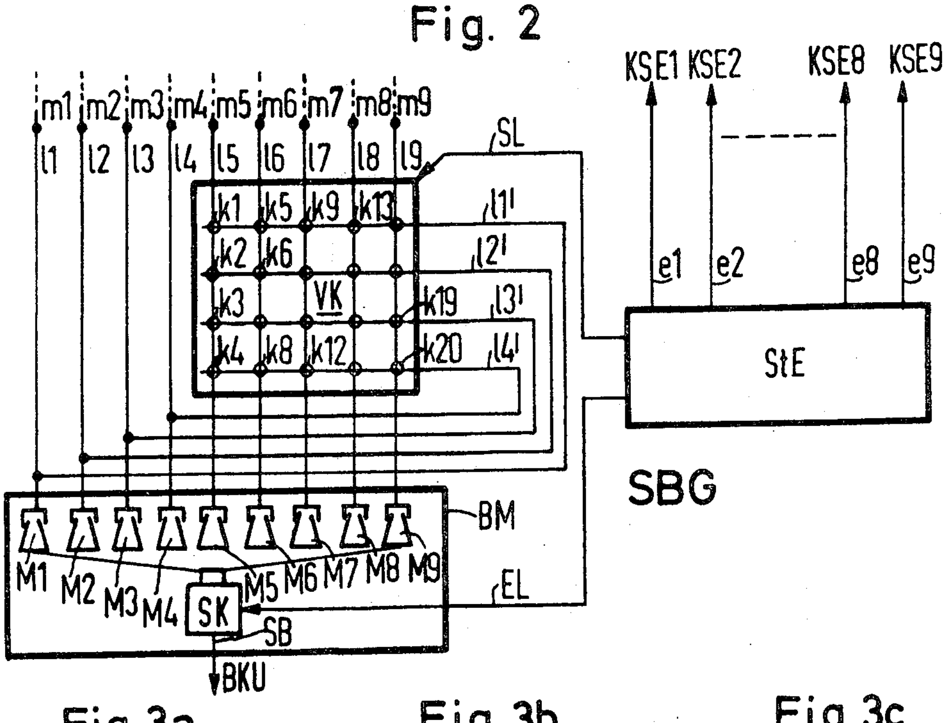
FIG. 2 is a more detailed schematic diagram of the combined picture emitting device in the FIG. 1 embodiment.

The combined picture emitter SBG used therefor comprises according to FIG. 2, of a picture combining device BM, a distribution switching network VK and a control device S*t*E. The picture combining device comprises, in a simple manner, a number of single picture monitors M1 to M9 corresponding to the highest possible number of conference participants. These monitors can be permanently connected with the camera lines *m*1 to *m*9 of the individual television conference subscriber stations over the monitor lines *l*1 to *l*9, respectively. The common device GE in FIG. 1 provides for the fact that at any one time not more than a prescribed number of television conference subscriber stations (in the example 9) can participate in a conference connection. The combined picture signal can be taken from the combined picture camera SK placed before these single-picture monitors, which are arranged spatially according to FIG. 3*a*, and can be transmitted over the combined picture line SB to the video conference transmission network BKU.

Figure 3A:
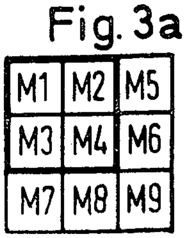
FIGS. 3*a*—*c* are diagrams illustrative of spatial arrangements of the combined pictures available from the device illustrated in FIG. 2 and FIGS. 4 and 5 are detailed schematic diagrams of the circuitry by which a conference connection is completed.

The manner of construction of the picture combining device BM yields the advantage that along with the saving of picture and line stores, no synchronization of the camera signals among each other is necessary. Normally, the locations M1 to M9 of the combined picture according to FIG. 3*a* are connected with the subscriber stations participating in the conference connection at the moment. While the single-pictures can be seen on the combined picture at the locations assigned to the subscriber stations participating in a television conference connection, the combined picture remains dark at the places belonging to the monitors which are not engaged.

Further, FIG. 2 shows a distribution switching network VK, which merely is a conventional switch matrix, inserted into the monitor lines 15 to 19 as well as a control device S*t*E, which can introduce switching functions in the distribution switching network VK over the control line SL and can influence the manner of composition of the combined picture emitted by the combined picture camera SK over the adjusting line EL and can influence the size of the single-pictures reproduced therein, depending on the number of occupied monitor lines.

This control device S*t*E is connected over 9 input lines *e*1 to *e*9 with the individual conference signal receivers KSE1 to KSE9 which are to be assigned permanently to the subscriber stations entering the conference connection and occupation signals are directed to the control from the conference signal receivers over these input lines. These occupation signals are evaluated in the control device and are required for the setting of the collective picture described in the following, especially for the case that only up to 4 conference subscriber stations are participating in a conference connection.

The control device StE, for directing the distribution switching network VK and for setting the combined picture camera SK, provides for the fact that the single picture size on the combined picture is one-ninth of the total picture size of the combined picture when there are 5 to 9 conference participants and is one-fourth of the total picture size of the combined picture with 3 and 4 conference participants. The control device StE recognizes, by the occupation signals received from the individual conference signal receivers, which of the monitor-lines 11 to 19 leading to the single-picture monitors are already occupied by camera lines *m*1 to *m*9 or are still free. For the case that the number of conference participants is not greater than 4, the monitor lines 15 to 19 can be switched over to as yet free single-picture monitors M1 to M4 over the lines 11' to 19', by means of the distribution switching network VK.

Figure 3B:
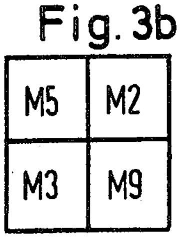

If, for example, the monitor lines 12, 13, 15 and 19 have been engaged by 4 subscriber stations desirous of a conference over their camera lines, and if there are no further occupation signals from other subscriber stations in the control device StE, then the participants appear on the single picture monitors M2 and M3 at the subscriber stations connected with the monitor lines 12 and 13, or at the locations M2 and M3 of the combined picture according to FIG. 3*a*. The camera signals which are on the monitor lines 15 and 19 are diverted to the single-picture monitors M1 and M4 by means of the coupling points *k*1 and *k*20 of the distribution switching network VK and the lines 11' and 14'. In addition, in this case the collective picture camera SK is regulated by the control device over the adjustment line EL with respect to position and size of the single-pictures sent by the conference subscriber stations. By means of this regulation, the single-pictures of the subscriber stations connected to the monitor lines 12, 13, 15 and 19 are arranged on the collective picture according to FIG. 3*b*.

Figure 3C:
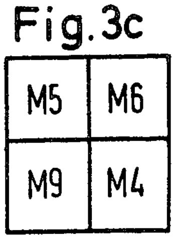

With the addition of further conference subscriber stations, e.g., with occupation of further monitor lines 14 and 16, the recoupling of the monitor lines 15 and 19 to the single-picture monitors M1 and M4 is made retrogressively, and the collective picture camera SK is again set such that the participant-individual single-pictures which are on the monitor lines 12, 13, 14, 15, 16 and 19 appear in the collective picture according to FIG. 3*a* at the locations M2, M3, M4, M5, M6 and M9. The single-picture locations assigned to monitors M1, M7 and M8 remain dark in the collective picture. If in the course of the conference the subscriber stations connected over the monitor lines 12 and 13 exit from the conference connection, then there results, after recoupling of monitor lines 15, 16 and 19 by means of the coupling points *k*1, *k*6, and *k*19 over the lines 11', 12' and 13' to the single-picture monitors M1, M2 and M3, as well as after a new setting of the collective picture camera, a combined picture, as for example is reproduced in FIG. 3*c*.

The control device StE, therefore, combines the single-pictures into a combined picture with the help of the distribution switching network VK, depending on the number of subscriber stations participating in the conference connection. The control device also regulates position and size of the single-picture on the combined picture.

With the aid of FIGS. 4 and 5, construction of a television conference connection between 3 conference subscriber stations N1, N2, N3 will now be described in more detail.

Figure 4:
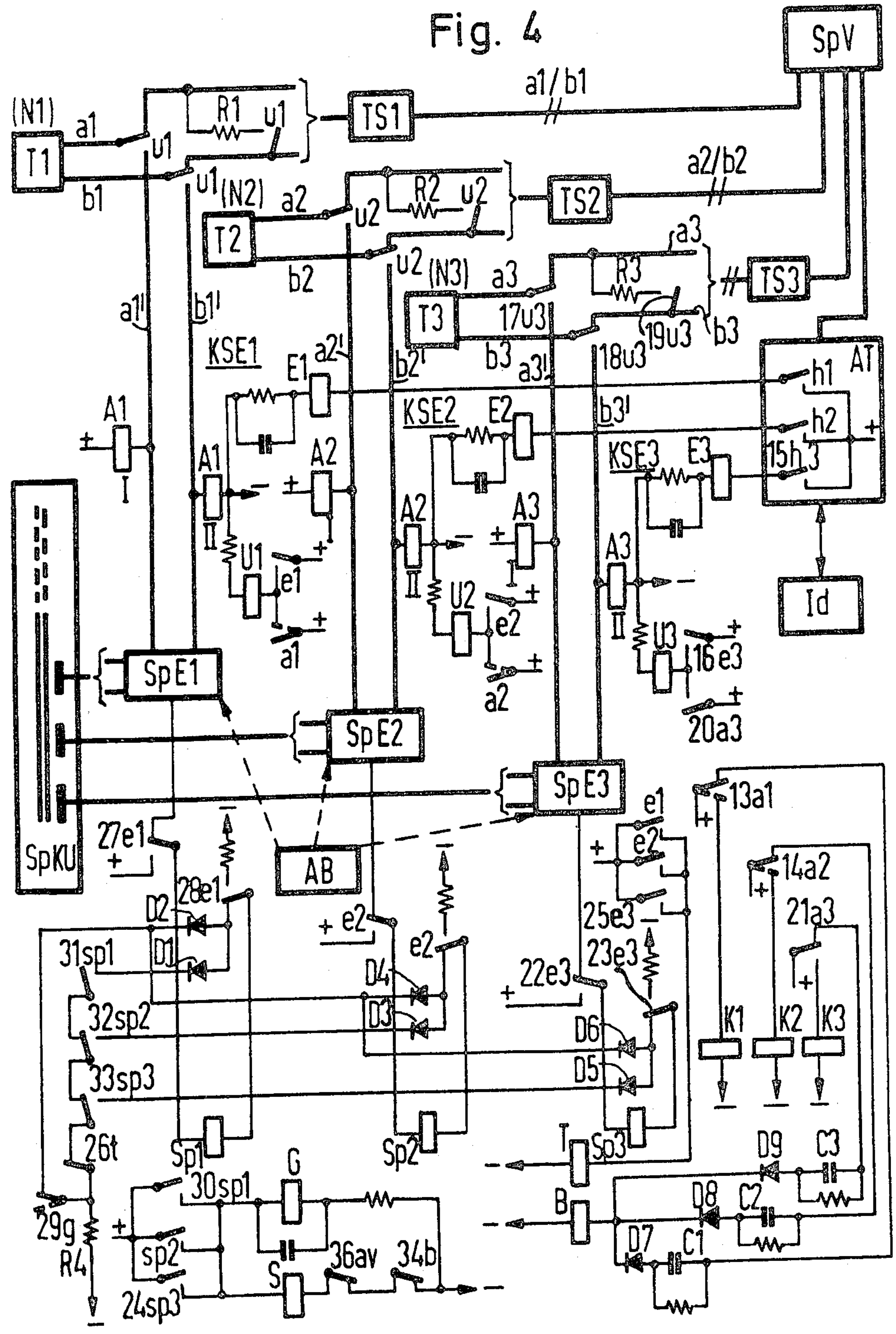

FIG. 4 shows the audio telephone sets T1, T2 and T3 of the 3 television conference subscriber stations with their subscriber circuits TS1, TS2 and TS3 and conference signal receivers KSE1, KSE2 and KSE3, which are assigned to these television conference subscriber stations upon entrance into the conference connection. The individual subscriber stations have auditory access with their audio cables *a*1, *b*1 or *a*2, *a*3, *b*3 to the telephone exchange device SpV, which is an otherwise conventional installation, over their subscriber circuits. Further, access is had by the same means to automatic subscriber station AT along with the identification device I*d*. Each conference signal receiver contains a relay which can be activated temporarily by the automatic subscriber station AT (e.g., E1 in KSE1), a switch-over relay (e.g., U1 in KSE1) as well as a double-winding connecting relay (e.g., A1 in KSE1). The individual subscriber stations N1, N2 and N3 have access to the voice conference transmission network SpKU, which is of conventional construction, over the audio cable pairs *a*1'/*b*1'; *a*2'/*b*2' and *a*3'/*b*3' containing the voice receivers SpE1, SpE2, SpE3.

Figure 5:
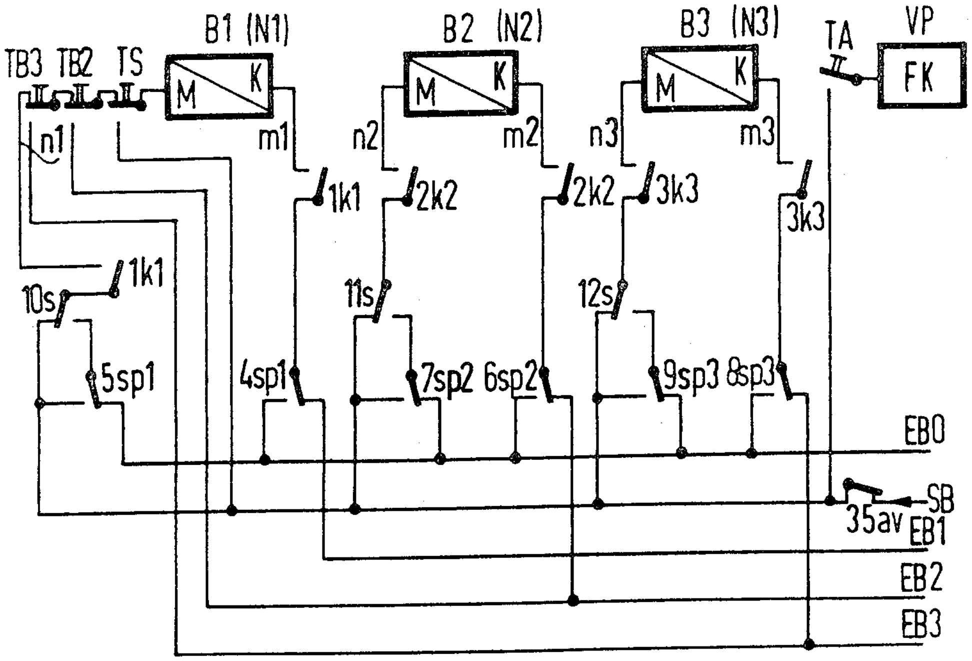

In addition, FIG. 4 shows a coupling relay K1, K2 or K3 for each subscriber station, by means of whose contact pairs 1*k*1, 2*k*2, 3*k*3, respectively, shown in FIG. 5, the video devices B1, B2, B3, of the individual subscriber stations can be coupled to the video conference transmission network BKU with the camera and with the receiver.

The relays SP1, SP2 and SP3, shown in FIG. 4, are controlled by the respective voice receivers, and can be permanently assigned to the individual subscriber stations. These provide, by means of their switch-over contacts 4*sp*1, 5*sp*1, or 6*sp*2, 7*sp*2, 8*sp*3, 9*sp*3, in FIG. 5, for the normal conference through-switching of the camera and receiver lines *m*1/*n*1, *m*2/*n*2, and *m*3/*n*3 in the video conference transmission network BKU. This switching state corresponds to the momentary state of the conference connection; that is, the respective participant who is speaking appears as a single-picture on the video receivers of all other conference participants.

FIG. 5 illustrates in detail pertinent portions of the video conference transmission network BKU. Only those portions are illustrated which are necessary to an understanding of the invention. FIG. 5 shows a single-picture line EBO assigned in common to all video devices, on which the picture of the respective conference participant who is speaking is available. Every video device has, further, at its receiver, access to the combined picture line SB, on which for the duration of the conference the combined picture is available. Each subscriber station, for the duration of the conference, has assigned thereto one of the single picture lines EB1, EB2 or EB3. These lines are connected to the cameras in the subscriber stations. The video conference transmission network is built so that the picture which is fixed on the corresponding camera line *m*1, *m*2, or *m*3 of each participant, who is speaking, is switched over the change-over contact 4$sp$1, 6$sp$2 or 8$sp$3, which are in the operational setting, as well as over the common single-picture line EBO to all video receivers of the persons participating in the conference, but who are not speaking at the moment. Further, this connection proceeds over the change-over contacts 5$sp$1, 7$sp$2 or 9$sp$3, which are in the rest state, as well as over the change-over contacts 10$s$, 11$s$, i.e., 12$s$, of the relay S, shown in FIG. 4, which is assigned in common to all conference subscriber stations, and which always responds when any of the participants is speaking at the moment. The participant who is speaking at the moment receives over his change-over contact 5$sp$1, 7$sp$2, or 9$sp$3, which is in the operational position, the combined picture directed over the combined picture line SB. The combined picture is received thereover in a pause in the conversation by the television receivers of all conference participants over the change-over contact 10$s$, 11$s$ or 12$s$.

In FIG. 5, when keys TS, TB2 and TB3 in receiver line $n$1 are activated a subscriber station is provided with a special authorization inasmuch as it can then receive the picture at any time.

In the following, it is assumed that the participants are already connected in conference at the telephone locations T1 and T2 (in FIG. 4). Their audio cables $a$1, $b$1 and $a$2, $b$2 have already switched over to the voice conference transmission network SpKU. The driving of these two subscriber stations proceeds from the conference signal receivers KSE1 and KSE2, which are already assigned to these subscriber stations. In the telephone exchange device SpV these two subscriber stations are denoted as occupied for incoming conversations, since through the change-over relay U1 and U2 the circuits of these subscriber stations are maintained for the telephone exchange device through insertion of the resistors R1 and R2. Through the double-winding relays A1 and A2 lying in the feeding connection, the coupling relays K1 and K2 are excited over their change-over contacts 13$a$1 and 14$a$2. Over the contact pairs of the latter relays 1$k$1 and 2$k$2 (in FIG. 5) the video lines of the two video devices B1 and B2 are connected to the video conference transmission network BKU. For the case that neither of these two participants is speaking, both video devices B1 and B2 are over their video lines $n$1 or $n$2, and over the contacts 10$s$ the 112, which are in the rest state, connected to the combined video line SB. The camera of the video device B1 is connected over the video line $m$1 and over the change-over contact 4$sp$1, which is in the rest state, to the individual single-picture line EB1, and the camera of the video device B2 is connected over the video line $m$2 and over the change-over contact 6$sp$2, which is in the rest state, to the individual single-picture line EB2.

If a participant now wants to enter the conference connection at telephone T3, then he dials the automatic subscriber station AT, by means of a special conference code number, over the telephone exchange device SpV. This allows the relay E3 to respond briefly in the conference signal receiver KSE3 over contact 15$h$3, given a positive identification result, and after a protective period, which is accorded the newly entering conference participant in order to introduce himself to the participants already in conference or to inform himself about the participants present by means of a conference reference picture. Over contact 16$e$3 the relay U3 responds, which by means of its contacts 17$u$3 and 18$u$3 switches over the audio cables $a$3, $b$3 of the telephone T3 over the cable pair $a3'/b3'$ to the voice conference transmission network SpKU, and by means of its contacts 19$u$3, holds the subscriber loop to the telephone exchange device, by inserting the resistor R3. With the take-over of the loop the double winding relay A3 connected in the feeding connection responds, which by means of its contacts 20$a$3 maintains a holding circuit for the relay U3 even after drop-out of the relay E3. Through contact 21$a$ 3 the coupling relay K3 is excited, and through the contact pair 3$k$3 thereof (in FIG. 5) the video device B3 of the newly entering subscriber station is connected to the video conference transmission network BKU. The video device B3 has its camera connected over the video line $m$3, the closed contact 3$k$3 and the contact 8$sp$3 to the common single-picture line EBO or to the participant-individual single-picture line EB3. The newly entering conference participant receives from the combined picture line combined picture of the conference participants already present over the video line $n$3, the closed contact 3$k$3, the contact 12$s$ and the contact 9$sp$3, which is activated briefly upon entrance.

As is shown in FIG. 4, the relay E3 had caused the relay SP3 to close briefly, over E3's contacts 22$e$3 and 22$e$3, whereby the receiver ends of video lines $n$1 and $n$2 were connected to the common single-picture line EBO. This connection was completed over the contacts 10$s$ or 11$s$ of the relay S, which was switched on by contact 24$sp$3 independent of whether a participant already connected to the conference was speaking at the moment. In addition, the common separation relay T had closed briefly, over contact 25$e$3, and this relay interrupted the holding circuit of a just switched-on relay SP1 or SP2 through opening its contacts 26$t$ and caused the corresponding relay to drop out. Through this switching function initiated by the relay E3, it is guaranteed that the picture of a newly entering conference participant appears preeminently for a short time on all screens of subscriber stations already in conference, whereas the one who is newly entering receives a combination picture of all the pre-existing participants.

However, if the newly entering conference participant extinguishes his connection with the automatic subscriber station AT during his introduction period, then the automatic subscriber station is again switched free immediately, without giving an impulse to the relay E3.

In the further course of the conference the through-switching of video cables in the video conference transmission network is controlled by the voice receivers SpE1, and SpE3 which are permanently assigned to the individual subscriber stations for the duration of the conference. The voice receivers have a short rise time and a long fall time; the common coordinating device AB provides that at any time only one voice receiver can respond (mutual response blocking). Therewith, the participant who is speaking at the moment enters the picture and is visible for all other participants, until after the fall time has expired, when another participant starts to speak and enters the picture for his part.

If the participant at telephone location T2 is speaking at the moment, then the camera of video device B2 is connected with the common single-picture line EBO over the video line *m*2, and the change-over contact 6*sp*2, and the B2 receiver is connected at its receiver with the combined picture line SB over the picture line *n*2 and the change-over contacts 11*s* and 7*sp*2. This participant receives, therefore, the combined picture, whereas the two other participants at the telephones T1 and T3 receive the picture of him who is speaking, over the change-over contacts 5*sp*1 and 9*sp*3, which are in the rest state. The privileged participant at video device B1 can now, for example by activating his key TB3, receive the picture of the participant at video device B3, or the combination picture by activating the key TS. If, after a pause in speaking of the participant at telephone T2, the participant at telephone T1 can pick up the conversation, then the relay SP1 responds, after the relay SP2 drops out, over the voice receiver S*p*E1, the contact 27*e*1, the relay SP1, the contact 28*e*1, the diode D2, the contact 29*g* and the resistor R4. After opening the contact 29*g* of the relay G, excited with delayed closing by the contact 30*sp*1, the relay SP1 is held closed over the diode D1 and the contacts 31*sp*1, 32*sp*2, 33*sp*3 and 26*t*, as well as the resistor R4, until the end of the fall time of the voice receiver S*p*E1 or until the entrance of a new conference participant in the conference connection. In the latter case, as already described above, after opening of the contact 26*t*, the relay SP1 drops out, as does the delayed relay G. The participant-individual relay SP of the newly entering conference participant can be kept in a holding circuit running over the diode D4 or D6, after drop out of the briefly responding relay E and until the drop of the common separation relay T, over the closed contact 29*g*.

The combined picture, which appears on the television receivers of all conference participants in the pause in speaking as well as on the screen of a newly entering conference participant, taking precedence, is in addition visible on the screens of all conference participants, taking precedence, when a participant leaves the conference. That is, if a participant leaves the conference, then with opening of that subscriber's circuit the relays in the conference signal receiver assigned to it drop out. If, for example, the participant at telephone T2 exits from the conference, then the connecting relay A2 drops out. Relay A2's contact 14*a*2, thus operated, closes a charging current circuit running over the diode D8 and the relay B for the condenser C2. The common relay B receives excitation current with the closing of this circuit and closes. The excited relay S drops out over the rest contact 34*b*, which opens. Relay B drops out again, or relay S can close only when the charing current of the condenser C2 is lower than the holding current of relay B.

Although on the basis of the maintenance of the loop in the telephone exchange device S*p*V a participant in the conference is occupied, nevertheless, the possibility exists for an operator at the exchange to connect into an existing conference connection. In a manner not shown, the operator can connect from location VP to the voice conference transmission network S*p*KU over the operator's own conference signal receiver.

For the purpose of transmission of a reference picture to the video devices of all conference participants, the exchange site is equipped with a television camera FK, which upon activation of a switching-on key TA can be connected directly to the common combined picture line SB. A relay (not shown) is switched on, upon activation of the key TA, and this relay separates the combined picture line SB from the combined picture emitter SBG through opening its rest contact 35*av* and prevents the excitation of the participant-common relay S, or causes it to drop out, as the case may be, through opening of its rest contact 36*av*. This guarantees that independent of the momentary state of the conference connection the video devices of all subscriber stations participating in the conference connection are connected with their receivers to the common combined picture line SB over the change-over contacts 10*s*, 11*s*, and 12*s* of the common relay S, which are in the rest position, upon activation of the switching-on key TA at the exchange site VP for the reception of the reference picture.

Finally, it should be mentioned that the signals for completing a conference connection, as described hereinabove, need not be voice actuated, and other types of signal sources may be used. For example, signals emitted directly from the subscriber stations may be used, such as those initiated by activation of a ground key.

The invention has been described herein in terms of a specific embodiment. However, this description cannot be considered as limiting the scope of the invention, which is defined by the appended claims.

I claim:

1. Apparatus for completing a conference connection in a telephone exchange system having the capability of processing video signals, comprising:

a plurality of subscriber stations connected to exchange, said subscriber stations including video devices comprising television cameras and television receivers, a plurality of conference signal receiver means in said exchange which are, respectively, coupled to those of said subscriber stations forming a conference connection, common video line means connected to said video devices in those of said subscriber stations forming a conference connection, first switching means for initiating the connection of the video device in a calling subscriber station to an existing conference connection, said first switching means being temporarily activated upon the coupling of a said conference signal receiver means to said new subscriber station, said first switching means being activated regardless of the state of the conference connection and second switching means located at each said subscriber station and coupled to said first switching means as to be activated by activation of the latter, said second switching means connecting the video devices of those of said subscriber stations in the conference connection to said common video line means as to receive video transmissions from said new subscriber station.

2. The apparatus defined in claim 1 further comprising:

means for producing a video signal representation of a combination of the video signals issuing from those of said subscriber stations already in the conference connection, and combination video line means for coupling the output of said means for producing to said subscriber stations, said second switching means in said calling subscriber station, upon actuation, connecting said video device therein to receive video signals from said combination line means.

3. The apparatus defined in claim 2 further comprising:

third switching means activated by activation of said first switching means for deactivating said second switching means upon the connection of the subscriber station associated therewith to said conference connection.

4. The apparatus defined in claim 1 further comprising:

automatic subscriber station means for receiving dial signals from said subscriber stations and for identifying calling subscriber stations responsive to received dial signals, said station means including means for temporarily activating the first switching means of a calling subscriber station associated therewith upon identification of the dial signals corresponding to said calling subscriber station.

* * * * *